(12) United States Patent
Chiu et al.

(10) Patent No.: US 6,819,795 B1
(45) Date of Patent: Nov. 16, 2004

(54) GENETIC SEGMENTATION METHOD FOR DATA, SUCH AS IMAGE DATA STREAMS

(75) Inventors: Patrick Chiu, Menlo Park, CA (US); Andreas Girgensohn, Menlo Park, CA (US); Wolf Polak, Sunnyvale, CA (US); Eleanor Rieffel, Mountain View, CA (US); Lynn Wilcox, Palo Alto, CA (US); Forrest H. Bennett, III, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 682 days.

(21) Appl. No.: 09/611,389

(22) Filed: Jul. 7, 2000

(51) Int. Cl.[7] ................................................ G06K 9/34
(52) U.S. Cl. ...................................................... 382/173
(58) Field of Search ................................ 382/173–180, 382/196–199, 224–228; 358/450–464; 345/581–582, 640–641

(56) References Cited

U.S. PATENT DOCUMENTS

| | | | | |
|---|---|---|---|---|
| 4,939,672 A | * | 7/1990 | Meadows | 345/856 |
| 5,048,095 A | * | 9/1991 | Bhanu et al. | 382/173 |
| 5,377,312 A | * | 12/1994 | Kobayashi | 358/1.17 |
| 5,729,623 A | * | 3/1998 | Omatu et al. | 382/155 |
| 5,764,814 A | * | 6/1998 | Chen et al. | 382/190 |
| 6,167,146 A | * | 12/2000 | Rogers et al. | 382/173 |
| 6,594,375 B1 | * | 7/2003 | Kato et al. | 382/107 |

OTHER PUBLICATIONS

Kim et al. "Genetic Algorithm–based segmentation of video sequences" Electronics Letters vol. 36, Issue 11, p. 946–947, May 2000.*

Boreczky, J.S. and Rowe, L.A., "Comparison of Video Shot Boundary Detection Techniques," *Storage and Retrieval for Still Images and Video Databases IV, Proc. SPIE 2670* pp. 170–179 1996.

Chiu, P. Kapuskar, A., Reitmeier, S., and Wilcox, L., "Note-Look: Taking Notes in Meetings with Digital Video and Ink," *Proc. of Multimedia '99.* To appear.

Daida, J.M., Bersano–Begey, T.F., Ross, S.J. and Vesecky, J.F., "Computer–Assisted Design of Image Classification Algorithms: Dynamic and Static Fitness Evaluations in a Scaffolded Genetic Programming Environment," *Genetic Programming 1996: Proc. of the First Annual Conference* MIT Press, pp. 279–284.

Falkanauer, E., "A genetic algorithm for Grouping," *Proc. of the Fifth Int'l. Symposium on Applied Stochastic Models and Data Analysis,* Gutierrez, R. and Valderrama, M.M. (eds), 1991 World Scientific Publishing Co., Singapore, pp. 198–206.

(List continued on next page.)

*Primary Examiner*—Jingge Wu
(74) *Attorney, Agent, or Firm*—Fliesler Meyer LLP

(57) ABSTRACT

A method, information system, and computer-readable medium is provided for segmenting a plurality of data, such as multimedia data, and in particular an image document stream. Segment boundary points may be used for retrieving and/or browsing the plurality of data. Similarly, segment boundary points may be used to summarize the plurality of data. Examples of image document streams include video, PowerPoint slides, and NoteLook pages. A genetic method having a fitness or evaluation function using information retrieval concepts, such as importance and precedence, is used to obtain segment boundary points. The genetic method is able to evaluate a large amount of data in a cost effective manner. The genetic method is also able to run incrementally on streaming video and adapt to usage patterns by considering frequently accessed images.

23 Claims, 7 Drawing Sheets

OTHER PUBLICATIONS

Girgensohn, A., and Boreczky, J., "Time–Constrained Keyframe Selection Technique," *IEEE International Conference on Multimedia Computing and Systems* 1999. To Appear.

Goldberg, D. E., "Genetic Algorithms in Search, Optimization, and Machine Learning," Addison–Wesley, 1989 (book).

Holland, J. H., *Adaptation in Natural and Artificial Systems* University of Michigan Press, 1975 (book).

Kinnear, K.E., Jr., *Advances in Genetic Programming* MIT Press, 1994 (book).

Mann, S., "Smart Clothing: Wearable Multimedia Computing and Personal Imaging to Restore the Technological Balance Between People and Their Environments," *Proc. of ACM Multimedia '96.* ACM Press pp. 163–174.

Mills, M.., Cohen, J., and Wong Y.Y., "A Magnifier Tool for Video Data," *Proc. of CHI '92.* ACM Press pp. 93–98.

Poli, R., "Genetic Programming for Image Analysis," *Genetic Programming 1996: Proc. of the First Annual Conference* MIT Press pp. 363–368.

Tackett, W.A., "Genetic Programming for Feature Discovery and Image Discrimination," *Proc. of the Fifth Int'l Conference on Genetic Algorithms,* 1993, pp. 303–309.

Uchihashi, S. and Foote, J., "Summarizing Video Using a Shot Importance Measure and Frame–Packing Algorithm," *Proc. of ICASSP'99,* 6:3041–3044.

Yeung, M.M. and Yeo, B–L, "Video visualization for Compact Presentation and Fast Browsing of Pictorial Content," *IEEE Trans. Circuits and Systems for Video Technology,* vol. 7, No. 5, pp 771–785.

Zhang, H.J., Low, C.Y., Smoliar, S.W., and Wu, J.H., "Video Parsing, Retrieval and Browsing: An Integrated and Content–Based Solution," *Proc. of Multimedia '95* ACM Press pp. 15–24.

\* cited by examiner

US 6,819,795 B1

GENETIC SEGMENTATION METHOD FOR DATA, SUCH AS IMAGE DATA STREAMS

FIELD OF THE INVENTION

The present invention relates to segmenting multimedia data, and in particular, segmenting image data streams.

BACKGROUND

Segmenting multimedia data is a fundamental problem. Segmentation requires breaking up a data stream into meaningful segments or parts. Properly segmented data streams can be better organized and reused. Segmented data streams provide points of access that facilitate browsing or retrieval. As more and more multimedia data are created and made available, segmentation methods can serve the important function of helping summarize this mass of material.

An image document stream having a plurality of image documents in a sequential order is one type of multimedia data stream. For example, a video includes an image document stream consisting of frames. The video may have meaningful parts or segments defined by camera changes, or scenes defined by semantically related shots. This is a difficult segmentation problem for machines (even for humans), because extracting semantics is hard.

A method may simply partition the image data stream at fixed time intervals, as described by Mills, M., Cohen, J., and Wong, Y. Y., 1992, A magnifier tool for video data. *Proceedings of ACM Multimedia '96*. ACM Press, pp. 163–174.

Other methods use color histograms and clustering, as described in Boreczky, J. S. and Rowe, L. A., 1996, Comparison of video shot boundary detection techniques. *Storage and Retrieval for Still Images and Video Databases IV, Proceedings of SPIE* 2670, pp. 170–179 ("Boreczky"); Girgensohn, A., and Boreczky, J., 1999, Time-constrained keyframe selection technique. *Proceedings of the 1999 IEEE International Conference on Multimedia Computing and Systems*. IEEE Computer Society, vol 1, pp. 756–761; Uchihashi, S. and Foote, J., 1999, Summarizing video using a shot importance measure and frame-packing algorithm ("Uchihashi"). *Proceedings of ICASSP '99*, vol. 6, pp. 3041–3044; Yeung, M. M. and Yeo, B-L, 1997, Video visualization for compact presentation and fast browsing of pictorial content. *IEEE Trans. Circuits and Systems for Video Technology*, vol. 7, no. 5, pp. 771–785; Zhang, H. J., Low, C. Y., Smoliar, S. W., and Wu, J. H., 1995, Video parsing, retrieval and browsing: An integrated and content-based solution. *Proceedings of Multimedia '95*. ACM Press, pp. 15–24.

Image data streams may be in many types and forms. Video types include produced video and raw video. Examples of produced video are news, movies and training videos. Examples of raw video are video of meetings, surveillance records, and wearable personal video cameras as described in Mann, S., 1996, 'Smart Clothing': Wearable multimedia computing and 'personal imaging' to restore the technological balance between people and their environments. *Proceedings of ACM Multimedia '96*. ACM Press, pp. 163–174.

Slide shows, including presentation slides, are also image data streams at a courser level of granularity. Examples of presentation slides include PowerPoint slides and note pages with images such as produced by the NoteLook system as described by Chiu, P., Kapuskar, A., Reitmeier, S., and Wilcox, L. NoteLook: Taking notes in meetings with digital video and ink. *Proceedings of Multimedia '99*. ACM, New York, pp. 149–158.

Therefore, there is a desire to provide a segmentation method, information system and computer-readable medium for segmenting data into meaningful sections for retrieval and browsing. For example, there is a desire to provide a method for segmenting image data streams so that summary image documents may be provided to summarize a lengthy image data stream.

SUMMARY OF INVENTION

A method, information system and computer-readable medium is provided for segmenting a plurality of data, such as multimedia data, and in particular, an image document stream.

According to an aspect of the present invention, a method segments a plurality of data into k segments. A first and second series of numbers is created ("first and second strings"), respectively, representing the plurality of data. The first and second strings have k−1 boundaries, respectively. First and second fitness function values are calculated for the data represented by the first and second strings, respectively. A third and fourth series of numbers ("third and fourth strings") respectively representing the plurality of data is created based on the first and second fitness function values. A partition point ("crossover") in the third and fourth strings is selected. The crossover partitions the third string into a head series of numbers and a tail series of numbers. The fourth string is also partitioned into a head series of numbers and a tail series of numbers. The third string tail series of numbers is interchanged with fourth string tail series of numbers to form a fifth and sixth series of numbers ("fifth and sixth strings"). The numbers in the fifth and sixth strings are adjusted to equal k−1 boundaries. Third and fourth fitness function values for the data represented by the fifth and sixth strings are then calculated. k segments is provided responsive to a comparison of the first, second, third and fourth fitness function values.

According to an aspect of the present invention, the plurality of data includes a plurality of images.

According to an aspect of the present invention, the plurality of the images includes a plurality of video frames.

According to an aspect of the present invention, the plurality of data includes a plurality of presentation slides.

According to an aspect of the present invention, the plurality of data includes note pages.

According to an aspect of the present invention, the plurality of data includes a plurality of non-image data.

According to an aspect of the present invention, the method further includes a step of reducing the plurality of data.

According to an aspect of the present invention, the plurality of data is reduced by subsampling the plurality of images and/or using a standard deviation measurement.

According to an aspect of the present invention, the fitness function is based on image similarity, importance and precedence.

According to an aspect of the present invention, the fitness function is based on histogram differences between adjacent data.

According to an aspect of the present invention, the fitness function equals:

$$f(S_k) = \sum_{i,j \in S_k} \alpha(i,j)h(i,j).$$

According to an aspect of the present invention, the fitness function equals:

$$f(S_k) = \sum_{\substack{i,j \in S_k \\ i \neq j}} h(i,j)\frac{(I_i + I_j)}{|i-j|^2}$$

According to an aspect of the present invention, the fitness function equals:

$$g(S_k) = \frac{f(S_k)}{(1 + |k - k_0|)}$$

According to an aspect of the present invention, the method further comprises a step of adding additional data to the plurality of data.

According to an aspect of the present invention, the method further comprises a step of varying k segments.

According to an aspect of the present invention, the fitness function includes an importance factor equal to:

$$I_i = A_i P_i \log(\delta(i)) \log \frac{1}{W_i}$$

According to an aspect of the present invention, an information system for segmenting a plurality of data into k segments is provided. The system is comprised of a processor coupled to a memory. The memory stores a software program for segmenting a plurality of data. The plurality of data is encoded with a series of 0's and 1's, where there are k−1 ones used as boundary segmentation points.

According to an aspect of the present invention, an article of manufacture, including a computer-readable memory is provided. A first software program forms a first string and a second string corresponding to a respective plurality of data, respectively. The first and second strings have boundary points. A second software program calculates a first and second fitness function value for the plurality of data represented by the first and second strings, respectively. A third software program creates a third and fourth string corresponding to the plurality of data based on the first and second fitness function values and a genetic operation. The second software program also calculates a third and fourth fitness function value for the plurality of data represented by the third and fourth strings. A fourth software program selects a set of data in the plurality of data based on the first, second, third and fourth fitness function values.

DETAILED DESCRIPTION

Figure 1A:
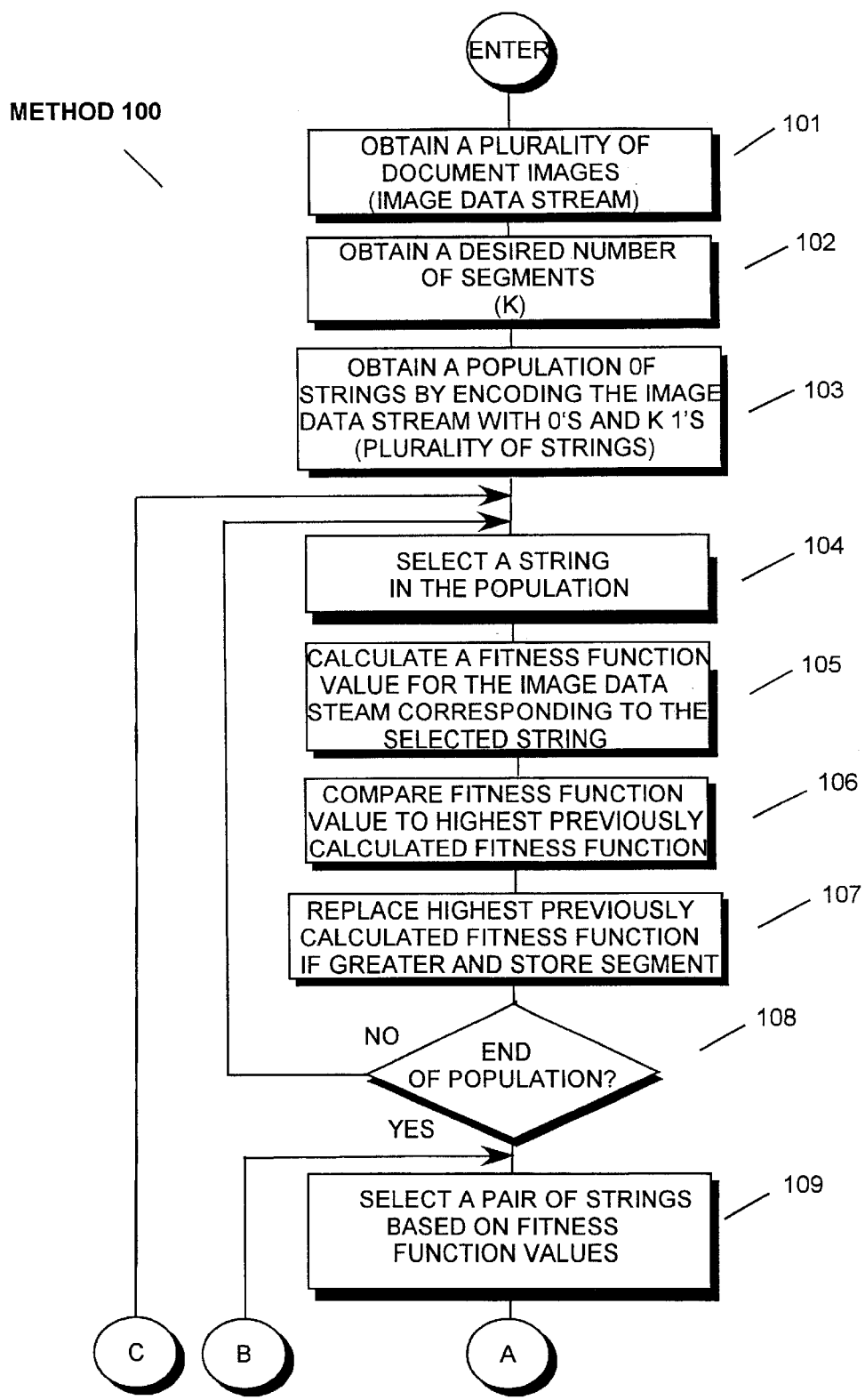
FIGS. 1a–b illustrate a flow chart for segmenting image data, according to an embodiment of the present invention.

The present method utilizes teachings in the biological arts, and in particular, genetic methods for segmenting data streams. There are several advantages of genetic methods over current segmenting methods such as a clustering method. First, genetic methods are independent of the prescribed evaluation function and can be tailored to support a variety of characterizations based on heuristics depending on genre, domain, user type, etc. Second, genetic methods are naturally suited for doing incremental segmentation, which may be applied to streaming video (e.g., video over the Web). Third, genetic methods can support dynamically updated segmentation that adapt to user patterns. As described below, one embodiment of the present invention increases the likelihood that frequently accessed images will appear as segment boundaries.

I. Evaluation Segmentations

When characterizing and evaluating segmentations of video, the specific applications must be kept in mind. For the purposes of browsing and summarization, we define similarity adjacency functions with varying degrees of sophistication. In the simplest form, these functions only take into account image differences. In the more complex forms, information retrieval ideas are used.

As one of ordinary skill in the art would appreciate, embodiments of the present invention include segmenting non-image data streams as well as image data streams. The genetic segmentation method remains the same for non-image data streams except that a different fitness function should take into account the appropriate characteristics of that medium and software for processing that medium.

A. Preprocessing

A video can have thousands of frames, and many adjacent ones are likely to be similar. The plurality of images may be reduced by only looking at those that are not too similar. For a non-video image document stream, this preprocessing step may be skipped. In an embodiment, a video may be subsampled to obtain a reduced set of image documents or frames F. For example, a video recorded at 30 frames per second is subsampled at one frame per second. From this reduced set F, the less similar image documents are selected by measuring their differences using color histograms as described in Boreczky. For any two images i and j we define:

h(i, j) histogram difference between i and j, dh(i)=h(i−1, i) with dh(0)=h(1, 0).

The number of frames in F is further reduced by taking only those with dh greater than one standard deviation from the mean:

$$F' = \{j \in F | dh(j) > \overline{dh} + \sigma\}.$$

The amount of reduction will vary depending on the genre of the video.

On this reduced set F', we define the length

δ(i)=number of frames in F from i to the next element in F'. On F', we also define dH(i) similar to dh(i)

dH(i)=histogram difference between the (i−1)-th and i-th elements of F'.

B. Evaluation Function

Various embodiments of the present invention use different evaluation functions. As one of ordinary skill in the art would appreciate, an evaluation function may be based on heuristics depending on genre, domain, user type, etc. For an embodiment of video summarization and indexing for browsing, an evaluation function is based on image similarity, importance, and precedence.

In an embodiment, k images with the highest dh(i) or dH(i) are used as segment boundaries. For browsing and summarization applications in which these k images are the access points to an image data stream, this does not produce a very good segmentation because the most salient images may be similar to each other (even if they are not similar to their immediate neighbors) and too much repetition will occur in the result.

To take into consideration the relative differences among the selected images, we define a similarity adjacency functions as follows. Let $S_k$ be a subset of k selected images in F', define:

$$f(S_k) = \sum_{i,j \in S_k} a(i,j) h(i,j). \qquad \text{(Equation No. 1)}$$

where α(i, j) is a function of weighting the histogram differences.

In an embodiment, α(i, j) may equal one. In an alternate embodiment, less weight is put on images farther apart by setting α(i, j)=1/|i−j|² for i≠j and 0 else.

Due to a large commonality of k-subsets of a set, there is not an efficient standard method to optimize Equation No. 1, even for modest-sized sets. One advantage in using a genetic method is to be able to search this space effectively.

Information retrieval ideas may also be used in weighting imaging by its importance. One way to define importance is to use a function that factors in the length of an element with its commonality, as described in Uchihashi, so that the longer and less common frames have greater importance. Unlike Uchihashi, an embodiment of the present invention does this without relying on a clustering of the images.

First, a set $C_i$ is defined to be those elements similar to i, $$C_i = \{j \in F' | h(i,j) < \overline{dh} + \sigma\}, \text{ and let } W_i = \frac{|C_i|}{|F'|},$$

then define the importance based on length and commonality by $$\log(\delta(i)) \log \frac{1}{W_i}.$$

Unlike Uchihashi, an embodiment of the present invention uses log of the length because δ(i) can have large variations. In videos, the lengths of the elements of F' can differ by a factor of a hundred.

Furthermore, we extend this notion of importance by providing another factor related to the precedence of a frame, so that earlier appearing frames are weighted more heavily than later ones in the same similarity class. There are several reasons for using precedence as a criterion. For video, it has been noticed in studies of video playback usage that the earlier appearances of an event are accessed more. For images of people or slides, the earlier ones may introduce or define things that the later ones will refer to. For video from surveillance or wearable personal video cameras, the frames can be processed backwards (or invert our precedence definition) to spotlight the most recent occurrences of interesting events.

Let $$B_j = \{j \in C_i | i \leq j\},$$

then we define the precedence factor by $$P_i = \frac{|B_i|}{|C_i|}.$$

Putting together the factors for length, commonality, and precedence, we obtain the importance:

$$I_i = P_i \log(\delta(i)) \log \frac{1}{W_i}.$$

In an embodiment, importance $I_i$ is used with an evaluation function, for example Equation No. 1, by weighting each term with an average importance, i.e., we set $$a(i,j) = (I_i + I_j)/|i-j|^2 \text{ for } i \neq j \text{ and 0 else}$$

In an embodiment, an evaluation function is $$f(S_k) = \sum_{\substack{i,j \in S_k \\ i \neq j}} h(i,j) \frac{(I_i + I_j)}{|i-j|^2} \qquad \text{(Equation No. 2)}$$

Qualitatively, the effect of this similarity adjacency function is making more nearby images more dissimilar and permits a certain amount of repetition in the overall summary to capture the rhythm of the video.

As described above, alternate embodiments of the present invention have different fitness functions or evaluation functions which characterize the desirable properties of segmentations, and will work with the method described below.

II. Genetic Segmentation Method

Figure 2:
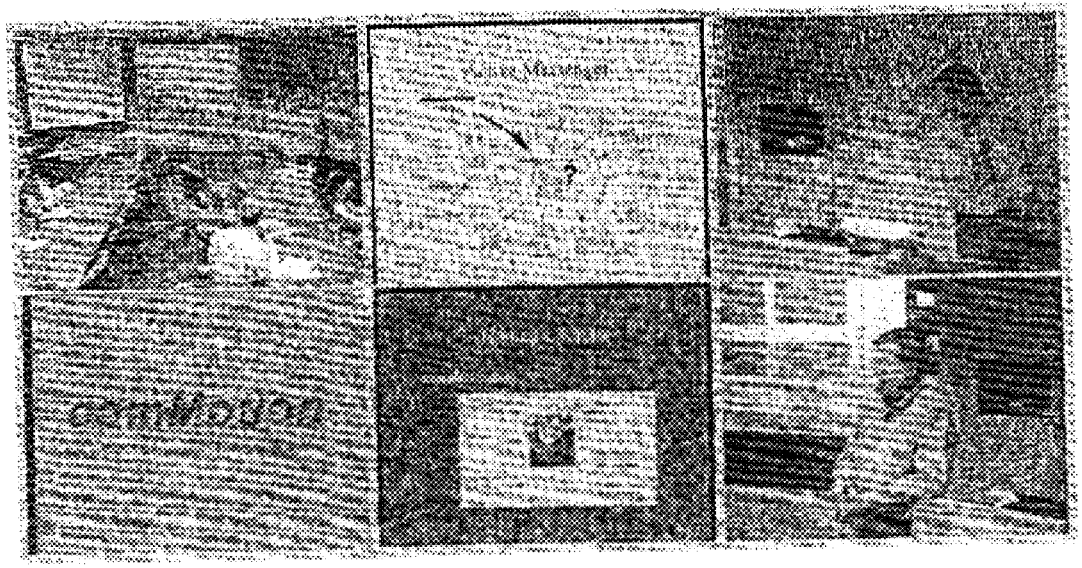
FIG. 2 illustrates six segmented frames of the plurality of video frames shown in FIG. 4 according to an embodiment of the present invention.
Figure 3:
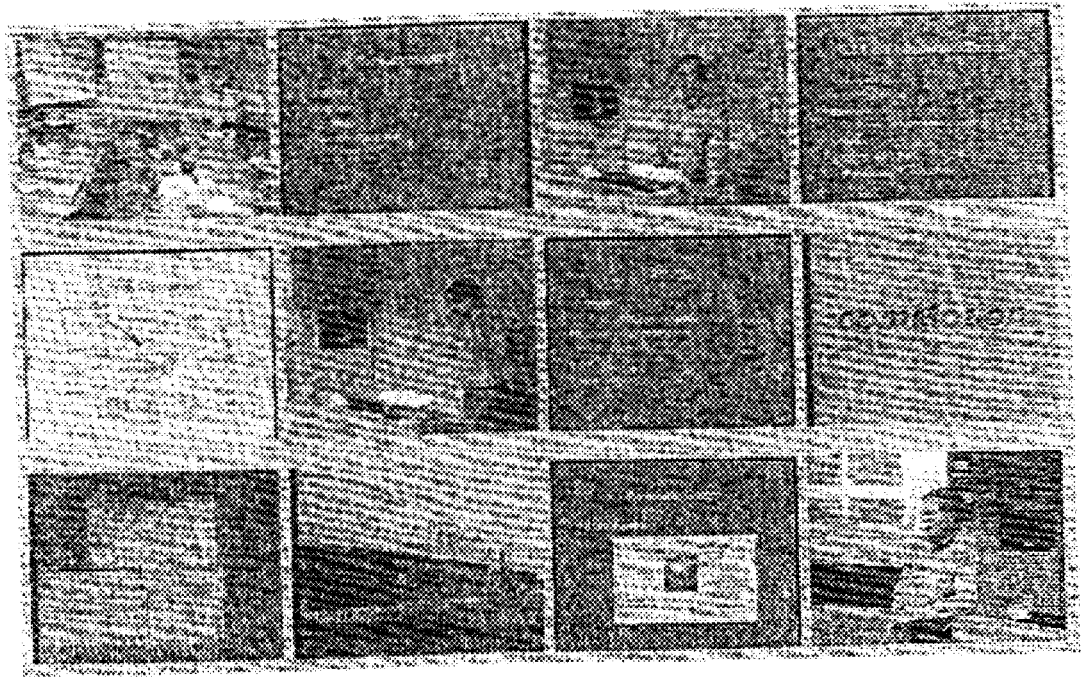
FIG. 3 illustrates twelve segmented frames of the plurality of video frames shown in FIG. 4 according to an embodiment of the present invention.
Figure 4:
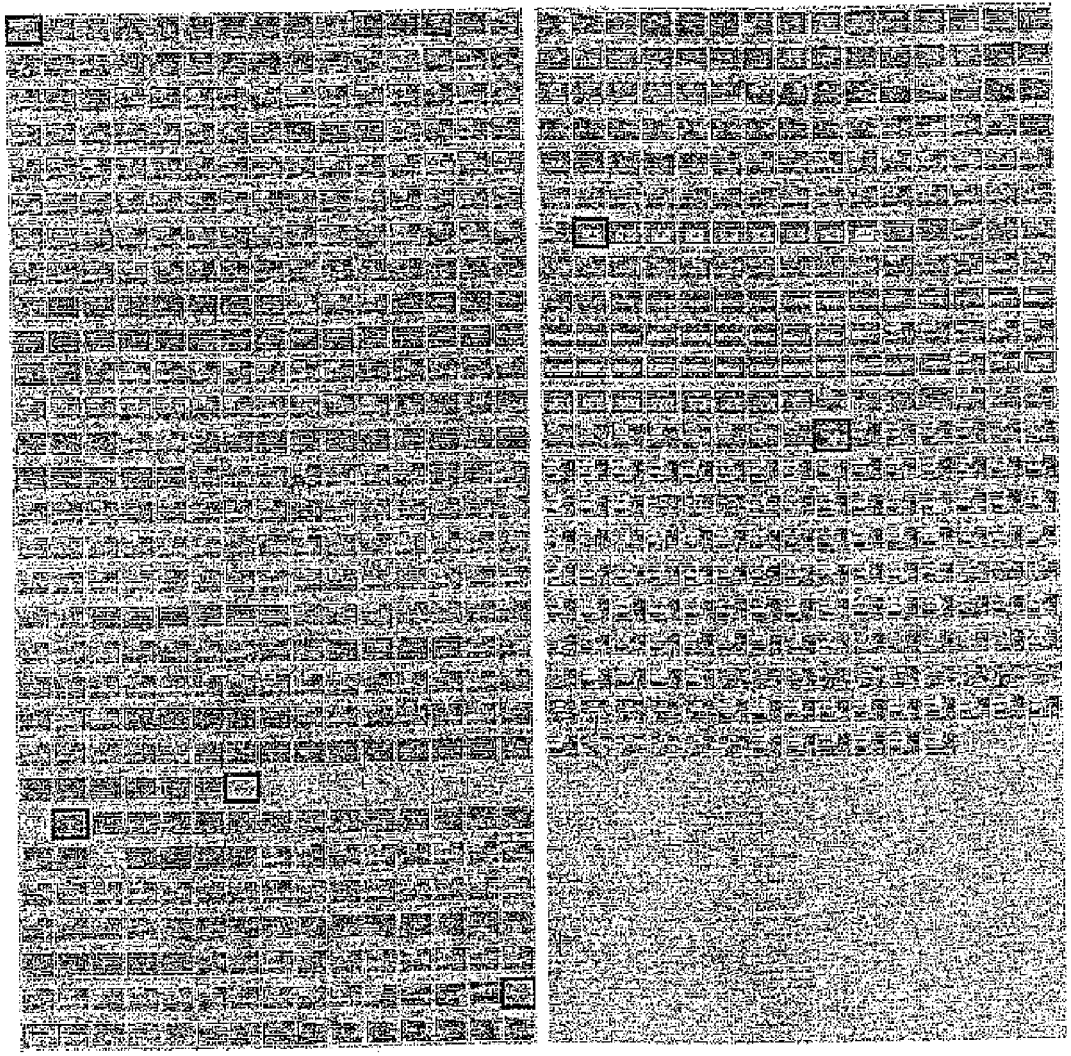
FIGS. 4 illustrates a plurality of video frames of a seminar according to an embodiment of the present invention.
Figure 5:
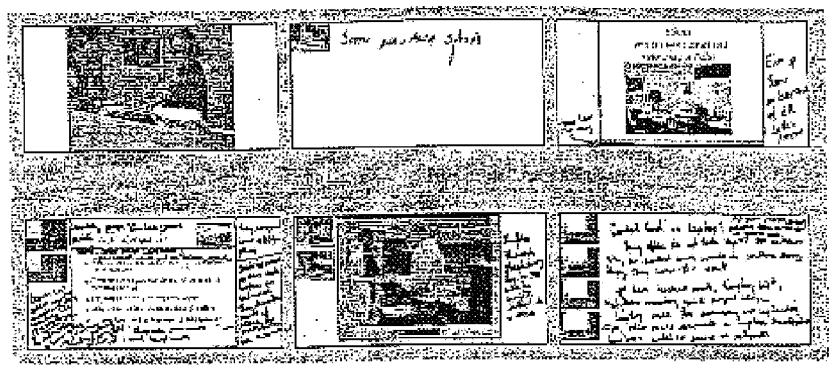
FIG. 5 illustrates six segmented note pages of the plurality of pages shown in FIG. 7 according to an embodiment of the present invention.
Figure 6:
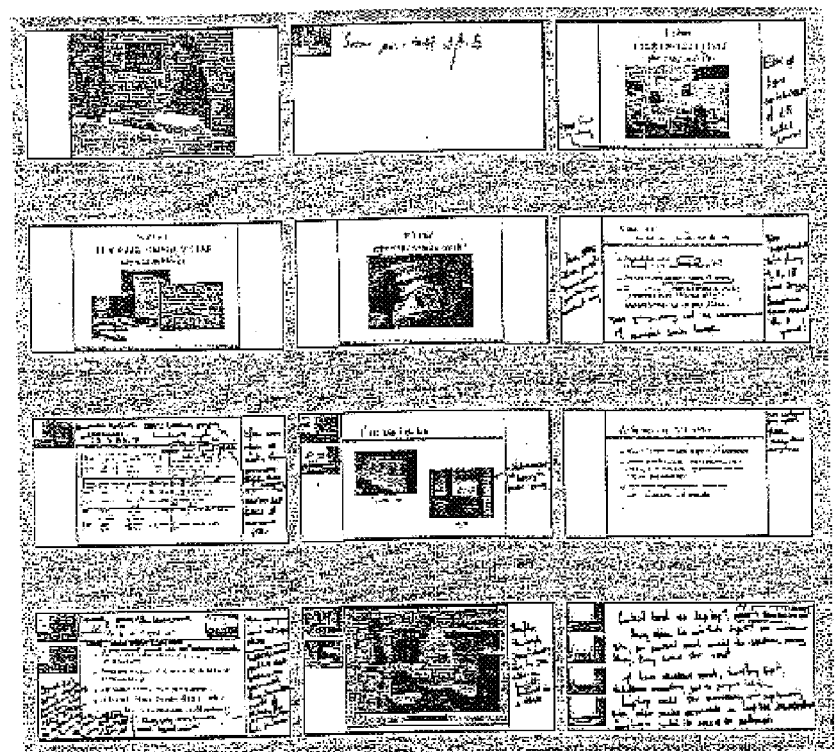
FIG. 6 illustrates twelve segmented note pages of the plurality of pages shown in FIG. 7 according to an embodiment of the present invention.
Figure 7:
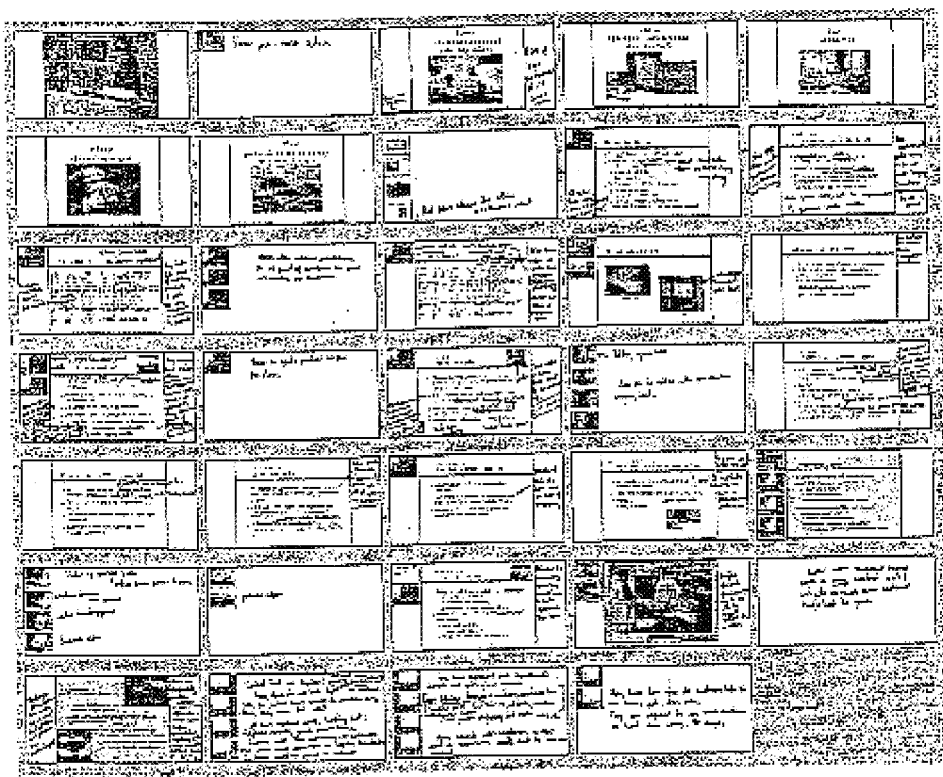
FIG. 7 illustrates a plurality of note pages used in a lengthy meeting according to an embodiment of the present invention.

First, the input and output of a genetic segmentation method is described. The input is a video and an integer k for the desired number of segment boundaries. For example, FIG. 4 illustrates a plurality of video frames sampled every five seconds in a video to be inputted into a genetic segmentation method. Similarly, FIG. 7 illustrates a plurality of presentation slides that may be input into a genetic segmentation method. The output of a genetic segmentation method is boundary images as access points for indexing and summarization. In other words, the output is a sequence of k boundary images, plus their importance scores. For example, FIGS. 2 and 3 illustrate an output of boundary video frames illustrated in FIG. 4. Similarly, FIGS. 5 and 6 illustrate boundary presentation slides output by inputting the slides of FIG. 7 into a genetic segmentation method. An embodiment which varies k is also described below. The importance scores may be used for layout purposes as described in Uchihashi.

An embodiment of the present invention can be described by specifying the encoding, fitness function, crossover and mutation operations as used in a genetic method. As one of ordinary skill in the art would appreciate, a population of individuals (or plurality of strings representing a plurality of data, such as an image document stream) is randomly generated, and the evolution process is performed iteratively one generation at a time. In the end, the individual (or string) with the highest fitness function is decoded to obtain boundary segments (or boundary images).

A. Encoding

A string or series of 0's and 1's corresponding to data, or image documents, is constructed as in a genetic method. The string is called a chromosome. A video data stream structure lends itself to be divided into contiguous groups, so a string is sufficient. In contrast, other methods use sets, Falkanauer, E. (1998) *Genetic Algorithms and Grouping Problems*. Wiley; Falkanauer, E. (1991) A genetic algorithm for grouping. *Proceedings of the Fifth International Symposium on Applied Stochastic Models and Data Analysis*, Gutierrez, R. And Valderrama, M. M. (eds.), 1991. World Scientific Publishing Co., Singapore, pp. 198–206.

The bit position of a chromosome string is an index for an element of a data stream (e.g., video frame in F'), read left to right. The length of the string is the number of images (i.e., |F'|). In an embodiment, 1's are used to denote the group boundaries; e.g. 00100010010 breaks up into the groups 00, 1000, 100, 10. In terms of the frames, the corresponding groups for $F'=\{i_0, i_1, i_2, \ldots i_{10}\}$ are $\{i_0, i_1\}$, $\{i_2, i_3, i_4, i_5\}$, $\{i_6, i_7, i_8\}$, $\{i_9, i_{10}\}$. In an embodiment, the n of segments is set to be a fixed constant. In an alternate embodiment, the user may select the number of segments. In an embodiment, the number of 1's represent the desired number of boundary images. In an alternate embodiment, encoding may be set to the left most bit to 1 for all segments.

B. Fitness Function

In an embodiment of the present invention, Equation No. 2 is used as a fitness function. In alternate embodiments, other evaluation functions may be used.

C. Crossover and Mutation

A genetic method uses randomly selected pairs of individual chromosomes to reproduce for the next generation. The probability of a chromosome being selected is proportional to its fitness function value relative to the other chromosomes in the same generation. To reproduce, a crossover procedure is defined. In a genetic method, two chromosome strings reproduce by selecting a random bit for the crossing site, and the strings are sliced at the site and the two tail pieces are swapped and rejoined with the head pieces to produce two progenies. For example, 10000010011 and 11110000000 crossed at the second site would produce 11000010011 and 10110000000.

A data stream allows the present method to use a string structure like a genetic method, but instead of crossing at any bit, crossings occur at segment boundaries. A segment is randomly selected, i.e., an $i \in S_k$, with equal probability for each index. This index is used as the crossing site. The chromosome strings are crossed like a genetic method, plus an additional step to alter the resulting strings so that they have exactly k 1's in order to maintain the fixed number of segments.

Reducing the number of segments in a string is done by merging the partial piece sliced by the crossover procedure with the adjacent segment; this way, the segment boundaries coming from earlier generations are preserved. Adjacent segments are then merged together until there are k 1's remaining.

Increasing the number of segments in a string requires introducing new boundaries not inherited from earlier generations. In an embodiment, a segment near the crossing site is selected and split at its weakest point, for example at the point with smallest dH. In an alternate embodiment, the amount of computation is reduced by using a mutation process to split the groups, which means randomly selecting a place to split. The examples described below uses this computation reduction embodiment.

Generally, mutations by random flipping of bits in the string is not preferred for doing segmentation, because it makes the segments rather unstable. Hence, embodiments of the present invention do not do additional mutations beyond its use for increasing the number of segments in the crossover procedure.

Below describes a crossover and mutation example. The following strings have 4 groups with 1's marking the segment boundaries on the left of 1's:

00010010010
01000100100

Crossing at the point after second segment of the first string, at site 6, we obtain:

000100|00100
010001|10010

In the first string, a random bit (i=2) is mutated to 1, increasing the number of segments to 4. In the second string, the third 1 is flipped to decrease the number of segments to 4. The final results are:

00110000100
01000010010

Having described the encoding, fitness function, crossover and mutation (as part of crossover) operations, a genetic segmentation method is specified.

D. Segment Fair Crossover

The key difference between crossover in a genetic method and crossover in an embodiment of the present invention is that in a genetic method, the crossover site is chosen with equal probability for each bit, whereas in an embodiment of the present invention, the crossover site is chosen with equal probability for each segment. This is called segment fair crossover.

When one lines up two parent chromosomes to perform a crossover, there will be short and long substrings where the alleles at contiguous loci in both parents are zero, like this:

```
loci number:        a b c         d
parent 1:       . . . 10000000000000001000 . . .

parent 2:       . . . 00001000000000000001 . . .
```

No matter which crossover site is selected in [a, b] and [c, d], the resulting progenies will be the same. In general, when there are k non-overlapping 1's in the two parent chromosomes, then there are only 2k+1 different crossover results possible. By choosing the crossover site with equal probability for each segment, our segment fair crossover uniformly samples from the 2k+1 possible crossover results. A genetic method deviates from this uniform sampling of possible crossover results, because it is less and less likely to select a crossover site the shorter the intersecting substring of 0's.

II. Genetic Method Flowchart

Figure 1B:
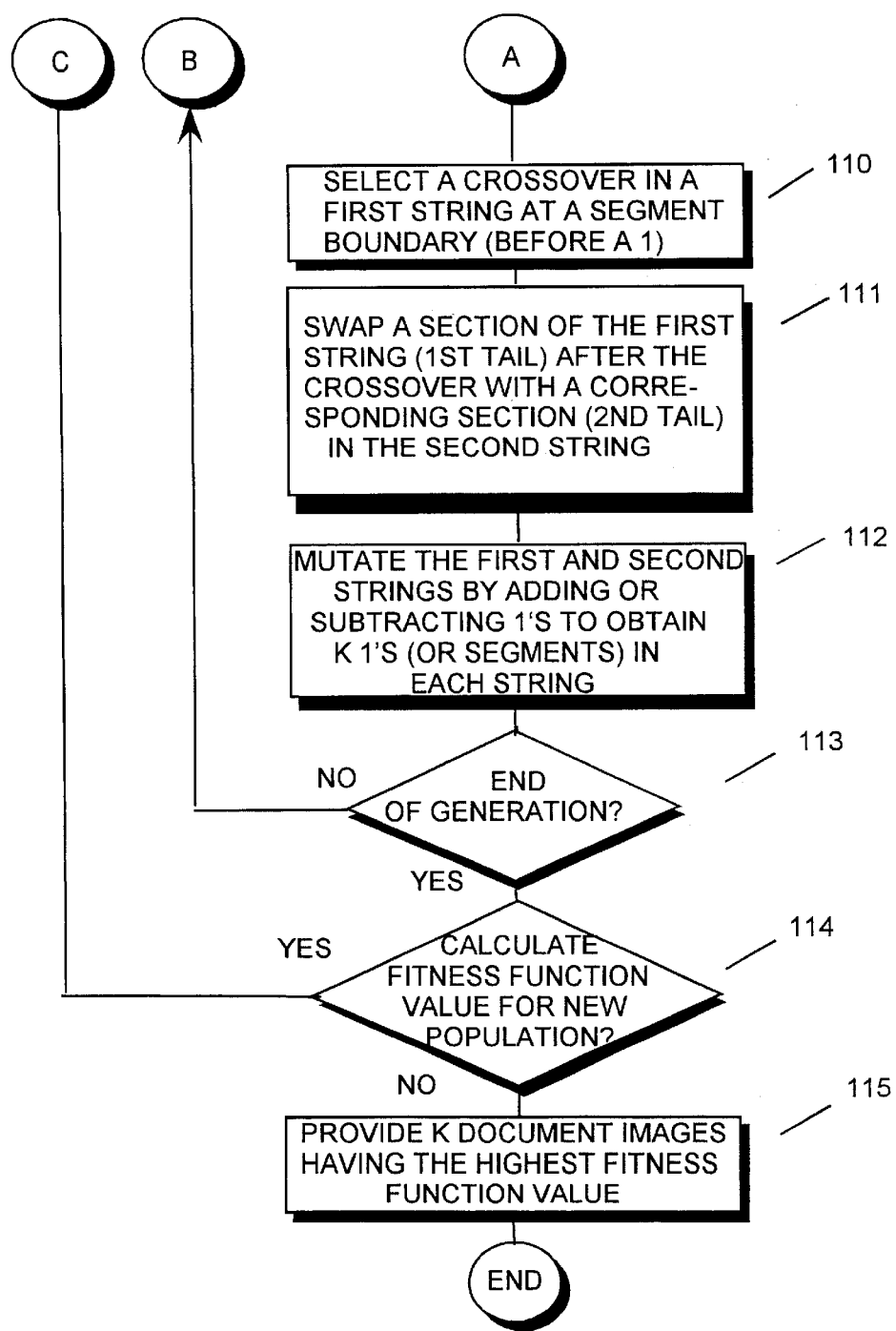

As one who is skilled in the art would appreciate, FIGS. 1*a*–*b* illustrate logic blocks for performing specific functions. In alternate embodiments, more or fewer logic blocks may be used. In an embodiment of the present invention, logic blocks may represent software programs, software objects, software functions, software subroutines, code fragments, hardware operations, user operations, singly or in combination.

FIGS. 1a–b describe a flowchart for segmenting image data according to an embodiment of the present invention. In an embodiment of the present invention, a plurality of sequential document images are obtained as illustrated by logic block 101.

FIG. 2 illustrates a plurality of document images in a video embodiment of the present invention. In alternate embodiments of the present invention, other non-image data may be obtained.

A desired number of segment boundary images k is obtained as illustrated in logic block 102. In an embodiment of the present invention, the number of segment boundary images is supplied by a user.

A population or plurality of strings are obtained as illustrated by logic block 103. The population of strings are obtained by encoding the image data stream with a plurality of randomly selected one's and zero's. In an embodiment of the present invention, each string includes k randomly-selected 1's used to represent boundary points or images.

In an alternate embodiment of the present invention, other numeric values may be used to represent data and/or boundary points.

A string is selected in the population as illustrated by logic block 104.

A fitness function value is calculated for the plurality of images obtained corresponding to the selected string as illustrated by logic block 105. In an embodiment of the present invention, the fitness function may be Equation No. 1 or Equation No. 2. In alternate embodiments of the present invention, a fitness function may be used for non-image data.

The calculated fitness function value is then compared to the highest previously calculated fitness function, as illustrated by logic block 106. In an embodiment, the initial fitness function value is 0.

If the calculated fitness function is greater than the previously calculated fitness function, the presently calculated fitness function value is stored along with the segment of images, as illustrated by logic block 107.

A determination is made whether a population has been evaluated or, in other words, whether all the strings in a population have a corresponding fitness function value, as illustrated by decision block 108. If one is not at the end of a population, control transitions to logic block 104 where functions described in logic blocks 104 through 107 are repeated for the next selected string. Otherwise, logic transitions to logic block 109 where a pair of strings in the population is selected based on their respective fitness function values. In an embodiment of the present invention, logic blocks 109–112 perform the crossover and mutation operation described above.

A crossover is selected in a first string at a segment boundary point as illustrated by logic block 110.

A section of the first string after the crossover, a first tail, is then swapped with a corresponding section in the second string, a second tail, as illustrated by logic block 111.

In an embodiment, the first and second strings are mutated by adding or subtracting 1's to obtain k 1's in both strings as illustrated by logic block 112.

Figure 8:
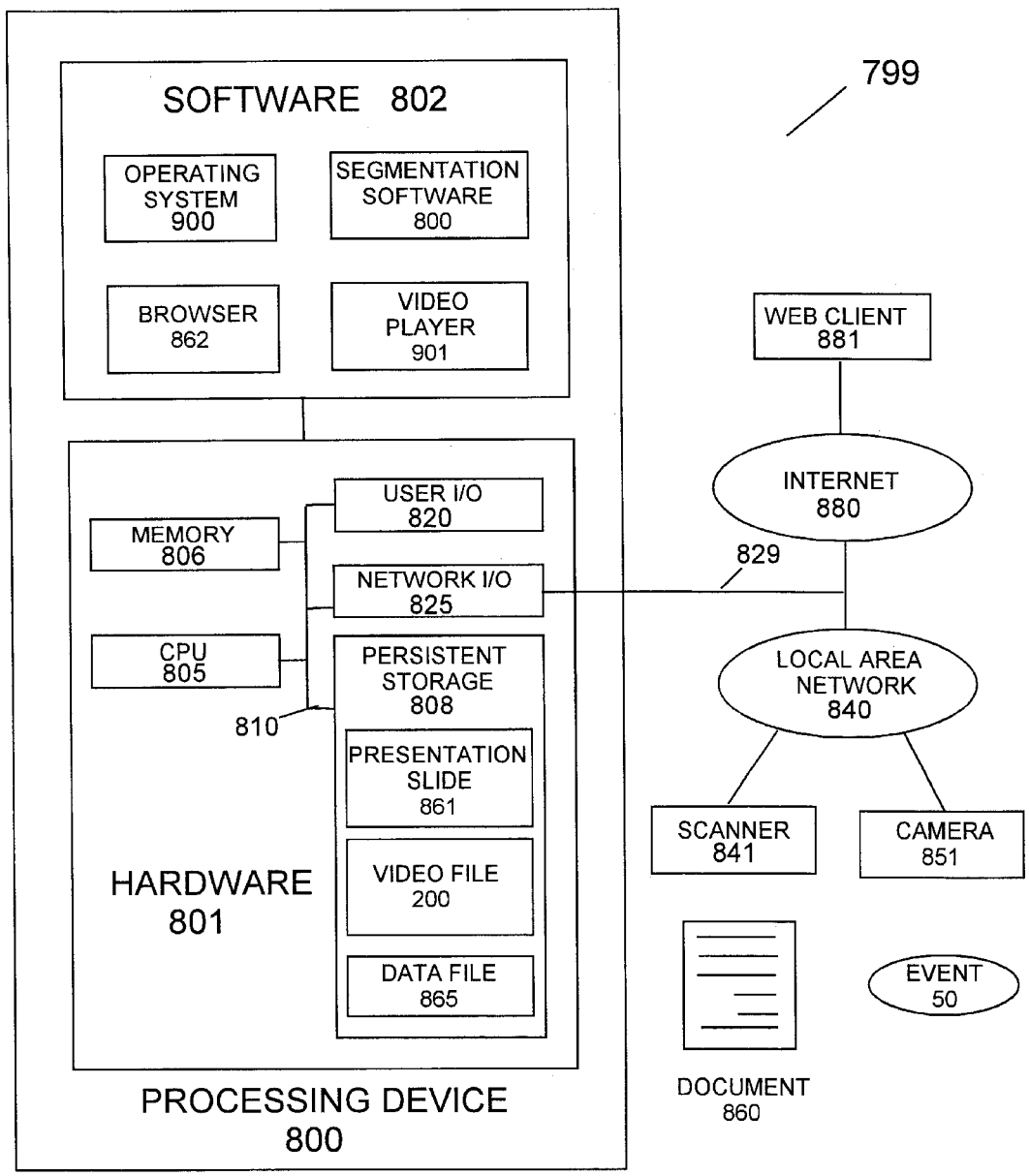
FIG. 8 illustrates a simplified software and hardware block diagram according to an embodiment of the present invention.

A determination is made whether a generation is completed as illustrated by decision block 113. If a generation has not been completed, logic transitions to block 104, where the functions as illustrated by logic blocks 104–112 are repeated. For example, a second pair of strings is selected for forming a generation. Otherwise, control transitions to decision block 114 where a determination is made whether a new population should be evaluated. If so, control transitions to logic blocks 104 through 113. Otherwise, control transitions to logic block 115. In logic block 115 k document images represented by 1's in a string having the highest fitness function value are provided. These document images may be provided to user I/O 820 or an equivalent, as illustrated in FIG. 8.

IV. Other Embodiments

Below describes alternate embodiments of the present invention. In particular, the alternate embodiments include similarity adjacent functions for handing incremental segmentation and varying the number k of the selected boundary images in the segmentation. In an embodiment in which images are used for browsing summarization, an embodiment is described in which segmentations are adapted dynamically to user access patterns.

A. Incremental Summarization

Embodiments of the present invention are evolutionary and are suitable for incremental segmentation which allows for summarization. Streaming video and databases of accumulated images are examples where incremental segmentation is used. An embodiment of the present invention maintains a population and lets it evolve as new images are added. The good image segment boundaries that have been found are more likely to survive. For each generation, the segment or collection of images having the highest fitness function value is used to determine the segmentation.

Between generations, new images are added. In an embodiment, the new images are pre-processed, as described above, by keeping a running average of dH. To keep the chromosome length bounded when new images are added, old ones can be removed by throwing out the ones with low importance or low dH. This is possible because in Equation No. 2, "epistasis" (how the bit positions combine to affect the fitness function) is very well behaved. Dropping lowly rated images has little effect on the fitness function value of Equation No. 2. To keep k fixed, if a chromosome loses a bit position marked by a 1, one of the new bit positions is randomly set to 1. Most of the new bit positions are set to 0, but occasionally (with the probability of one over the length of the chromosome), a bit position is set to 1, and a random segment is merged to keep k fixed.

B. Varying k

In an embodiment, the number of segment boundary images k may vary. This is accomplished by normalizing the evaluation function, Equation No. 2 to a prescribed target $k_0$ $$g(S_k) = \frac{f(S_k)}{(1 + |k - k_0|)} \quad \text{(Equation No. 3)}$$

and simplifying the crossover so as not to keep k constant. In this embodiment, the number of images will not be exactly $k_0$, but some number around $k_0$ that provide the potentially better segmentation.

C. Adapting to User Access Patterns

In an embodiment, segmentation can be dynamically updated to reflect user access patterns. The most frequently accessed images by users are weighted more heavily in the importance term of Equation No. 2, and the segmentation is incrementally updated. In an embodiment, the update schedule may be daily, weekly, or longer.

Let $a_i$ be the number of times an image i has been accessed or viewed by a user, an access frequency factor is defined by $A_i=1+\log(1+a_i)$. The following is then used for the importance in equation (2):

$$I_i = A_i P_i \log(\delta(i)) \log \frac{1}{W_i} \quad \text{(Equation No. 4)}$$

V. EXAMPLES

Two examples of implementing embodiments of the present invention are described below.

A. Video

First, an embodiment of the present invention was used to summarize an hour-long videotaped seminar illustrated in FIG. 4. FIGS. 2 and 3 illustrate the video segmented with k equaling 5 and 11, and the first image of the first segment, respectively. Six and twelve images were chosen because these numbers have several divisors and can produce different layouts (e.g., 6 gives 1×6, 2×3, 3×2, 6×1). As can be seen, very dissimilar images which may be used for summarizing or indexing for browsing and retrieval are displayed in FIGS. 2 and 3 from the voluminous frames illustrated in FIG. 4.

In the video example, a population size of 2,000 runs over 100 generations were used. The length of the video was approximately one hour, and subsampling and reduction gave a |F|=7765, and a |F'|=149. Preprocessing took approximately two minutes, and the method for obtaining the segmented images took approximately three minutes.

The three topics of the videotaped seminar were "Active Messenger," "comMotion," and "Nomadic Radio," and video frames of the videotaped slides introducing these topics were selected along with two pictures of the speaker and a picture of the room.

B. Presentation Slides

A second example uses a set of note pages containing annotated presentation slide images and pictures illustrated in FIG. 7. The note pages are provided by FXPAL NoteLook System described by Chiu, P., Kapuskar, A., Reitmeier, S., and Wilcox, L., NoteLook: Taking notes in meetings with digital video and ink. *Proceedings of ACM Multimedia '99*. ACM, New York, pp. 149–158, which contains a variety of visual images: Presentation slide images, pictures and ink annotations. FIGS. 5 and 6 illustrate a plurality of segmented note pages, output from an embodiment of the present invention. FIG. 5 illustrates six note pages segmented with k equaling 5, and FIG. 6 illustrates 12 presentation slides segmented with k equaling 11 along with the first image of the first segment. As with the video example above, the note pages are distinctly dissimilar.

In alternate embodiments, a method uses a simpler image data streams, such as a collection of presentation slides (e.g., PowerPoint slides).

In the note page example, a population of 1,000 runs over 100 generations were used. As with the video example above, FIGS. 5 and illustrate distinctly dissimilar data from the note pages shown in FIG. 7.

C. Parameters

The parameters for the above examples include crossover for 100% of the genetic operations. Mutation was introduced only during crossover segment splits as defined above. Elitism was not used. The fitness function of Equation No. 2 was used in the provided examples.

VI. Hardware and Software Architecture Embodiment

FIG. 8 shows hardware and software components of an exemplary information system suitable for segmenting data, according to an embodiment of the present invention. System 799 of FIG. 8 includes a processing device 800 connected by one or more communication pathways, such as connection 829, to a local-area network (LAN) 840 and also to a wide-area network, here illustrated as the Internet 880. Through LAN 840, processing device 800 can communicate with other processing devices, such as scanner 841 and camera 851. In an alternate embodiment, scanner 841 and camera 851 are not physically connected to LAN 840. Through the Internet 880, processing device 800 can communicate with other processing devices, both locally and remote, such as web client 881. As will be appreciated, the connection from processing device 800 to Internet 880 can be made in various ways, e.g., directly via connection 829 (wired or wireless), or through local-area network 840, or by modem (not shown).

Processing device 800 in an embodiment of the present invention is a personal or office computer. An exemplary embodiment uses a Dell® Dimension® XPS B Series desktop computer (Dell Computer Company, Round Rock, Tex.). In an alternate embodiment, processing device 800 is a personal digital assistant, hand-held computer, "Smart" telephone, information appliance, or an equivalent thereof. For purposes of exposition, processing device 800 can be conveniently divided into hardware components 801 and software components 802; however, persons of skill in the art will appreciate that this division is conceptual and somewhat arbitrary, and that the line between hardware and software is not a hard and fast one. Further, it will be appreciated that the line between a host computer and its attached peripherals is not a hard and fast one, and that in particular, components that are considered peripherals of some computers are considered integral parts of other computers. Hardware components 801 include a processor (CPU) 805, memory 806, persistent storage 808, user I/O 820, and network interface 825. These components are well understood by those of skill in the art and, accordingly, need be explained only briefly here.

Processor 805 can be, for example, a microprocessor or a collection of microprocessors configured for multiprocessing. In an embodiment of the present invention, a single Pentium® 350 processor provided by Intel® of Santa Clara, Calif., is used. It will be appreciated that the role of processing device 800 can be taken in some embodiments by multiple computers acting together (distributed computation); in such embodiments, the functionality of processing device 800 in the system of FIG. 8 is taken on by the combination of these processing devices, and the processing capabilities of processor 805 are provided by the combined processors of the multiple computers.

Memory 806 can include a computer-readable medium such as read-only memory (ROM), random-access memory (RAM), virtual memory, or other memory technologies, singly or in combination. Persistent storage 808 can include a computer-readable medium, for example, a magnetic hard disk, a floppy disk, or other persistent read-write data storage technologies, singly or in combination. It can further include mass or archival storage, such as can be provided by CD-ROM or other large-capacity storage technology. (Note that web client 881 may be have a similar software and hardware components.) In an embodiment, persistent storage 808 stores presentation slides 861, video file 200 and data file 865.

User I/O (input/output) hardware 820 typically includes a visual display monitor such as a CRT or flat-panel display, an alphanumeric keyboard, and a mouse or other pointing device, and optionally can further include a printer, an optical scanner, or other devices for user input and output. In an embodiment, user I/O 820 is used to select the playback of a segment of video file 200, presentation slide 861 or data file 865 provided by segmentation software 800.

Network I/O hardware 825 provides an interface between processing device 800 and the outside world. More specifically, network I/O 825 lets processor 805 communicate via connection 829 with other processors and devices through LAN 840 and through the Internet 880.

Software components 802 include an operating system 900 and a set of tasks under control of operating system 900. As known by one of ordinary skill in the art, operating system 900 also allows processor 805 to control various devices such as persistent storage 808, user I/O 820, and network interface 825. Processor 805 executes the software of operating system 900 and its tasks in conjunction with memory 806 and other components of computer system 800.

In an embodiment, software 802 includes browser 862 and video player 901 for playing video file 200. In an embodiment, video player 901 is a Moving Picture Experts Group (MPEG) player or RealVideo player. In an embodiment of the present invention, browser 862 may be a Netscape® 6.0 browser provided by Netscape® Communications Corporation located in Mountain View, Calif.

In an embodiment of the present invention, segmentation software 800 is stored on an, article of manufacture, computer-readable medium such as a magnetic hard disk, floppy disk, CD-ROM, or other writeable data storage technologies, singly or in combination. In an embodiment of the present invention, software 800 carries out the logic illustrated in method 100 of FIGS. 1a–b.

Persons of skill in the art will appreciate that the systems of FIG. 8 are intended to be illustrative, not restrictive, and that a wide variety of computational, communications, and information and document processing devices can be used in place of, or in addition to, what is shown in FIG. 8. For example, connections through the Internet 880 generally involve packet switching by intermediate router computers (not shown), and processing device 800 is likely to access any number of processing devices, including but by no means limited to scanner 841 and camera 851.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents:

What is claimed is:

1. A method for segmenting a plurality of data into k segments, comprising the steps of:
    (a) creating a first and second series of numbers ("first and second strings") respectively, representing the plurality of data, wherein the first and second strings have k−1 boundaries, respectively;
    (b) calculating a first and second fitness function values for the data represented by the first and second strings, respectively;
    (c) creating a third and fourth series of numbers ("third and fourth strings") respectively, representing the plurality of data based on the first and second fitness function values;
    (d) selecting a partition point ("crossover") in the third and fourth strings, wherein the crossover partitions (1) the third string into a head series of numbers and a tail series of numbers, and (2) the fourth string into a head series of numbers and a tail series of numbers;
    (e) interchanging the third string tail series of numbers with the fourth string tail series of numbers to form a fifth and sixth series of numbers ("fifth and sixth strings");
    (f) adjusting the numbers in the fifth and sixth strings to equal k−1 boundaries;
    (g) calculating a third and fourth fitness function values for the data represented by the fifth and sixth strings; and
    (h) providing k segments responsive to a comparison of the first, second, third and fourth fitness function values.

2. The method of claim 1, wherein the plurality of data includes a plurality of images.

3. The method of claim 1, wherein the plurality of images includes a plurality of video frames.

4. The method of claim 1, wherein the plurality of data includes a plurality of presentation slides.

5. The method of claim 1, wherein the plurality of data includes note pages.

6. The method of claim 1, wherein the plurality of data includes a plurality of non-image data.

7. The method of claim 1, wherein the method further includes a step of reducing the plurality of data.

8. The method of claim 7, wherein the reducing of the plurality of data includes a subsampling a plurality of images.

9. The method of claim 7, wherein the reducing the plurality of data based on a standard deviation measurement.

10. The method of claim 1, wherein the fitness function is based on image similarity, importance and precedence.

11. The method of claim 1, wherein the fitness function is based on histogram differences between adjacent data.

12. The method of claim 1, wherein the fitness function equals:

$$f(S_k) = \sum_{i,j \in S_k} a(i,j) h(i,j).$$

13. The method of claim 1, wherein the fitness function equals:

$$f(S_k) = \sum_{\substack{i,j \in S_k \\ i \neq j}} h(i,j) \frac{(I_i + I_j)}{|i-j|^2}.$$

14. The method of claim 1, wherein the fitness function is based on precedence.

15. The method of claim 1, wherein the fitness function is based upon importance.

16. The method of claim 1, further comprises the step of:
    (i) adding additional data to the plurality of data.

17. The method of claim 1, further comprising the step of:
    (i) varying k segments.

18. The method of claim 13, wherein the fitness function equals:

$$g(S_k) = \frac{f(S_k)}{(1+|k-k_0|)}.$$

19. The method of claim 1, wherein the fitness function includes an importance factor equal to:

$$I_i = A_i P_i \log(\delta(i)) \log \frac{1}{W_i}.$$

20. The method of claim 1, wherein the first and second strings include k−1 ones representing segment boundaries.

21. An article of manufacture, including a computer-readable memory, comprising:
 (a) a first software program for forming a first string and a second string corresponding to a plurality of data, wherein the first and second strings have boundary points;
 (b) a second software program for calculating a first and second fitness function values for the plurality of data represented by a first string and the second string, respectively;
 (c) a third software program for creating a third and fourth string corresponding to the plurality of data based on the first and second fitness function values and a genetic operation, wherein the second software program calculates a third and fourth fitness function values for the data represented by the third and fourth strings; and
 (d) a fourth software program for selecting a set of data in the plurality of data based on the first, second, third and fourth fitness function values.

22. The article of manufacture of claim 21, wherein the genetic operation includes a crossover operation, wherein the crossover operation interchanges a pair of string tails at a boundary point.

23. The article of manufacture of claim 21, wherein the genetic operation includes a mutation operation, wherein the mutation operation adjusts the number of ones in the third and fourth strings.

\* \* \* \* \*